BACKGROUND SCANNING SYSTEM FOR FACSIMILE COMMUNICATION

Filed Dec. 11, 1963

6 Sheets-Sheet 1

INVENTOR.
STEPHEN E. TOWNSEND
BY Anthony D. Cennamo
Stanley Z. Cole
ATTORNEY

May 30, 1967 S. E. TOWNSEND 3,322,893

BACKGROUND SCANNING SYSTEM FOR FACSIMILE COMMUNICATION

Filed Dec. 11, 1963 6 Sheets-Sheet 2

INVENTOR.
STEPHEN E. TOWNSEND

BY Anthony D. Cennamo
Stanley Z. Cole
ATTORNEY

INVENTOR.
STEPHEN E. TOWNSEND
BY Anthony D. Cennamo
Stanley Z. Cole
ATTORNEY

INVENTOR.
STEPHEN E. TOWNSEND
BY Anthony D. Cennamo
Stanley Z. Cole
ATTORNEY

INVENTOR.
STEPHEN E. TOWNSEND
BY Anthony D. Cennamo
Stanley Z. Cole
ATTORNEY

INVENTOR.
STEPHEN E. TOWNSEND
BY Anthony D. Cennamo
Stanley Z. Cole
ATTORNEY

United States Patent Office 3,322,893

Patented May 30, 1967

3,322,893

BACKGROUND SCANNING SYSTEM FOR FACSIMILE COMMUNICATION

Stephen E. Townsend, Rochester, N.Y., assignor to Xerox Corporation, Rochester, N.Y., a corporation of New York Filed Dec. 11, 1963, Ser. No. 329,641
6 Claims. (Cl. 178—6.8)

This invention relates generally to an electronic facsimile communication system and particularly, to a facsimile system capable of distinguishing in a composite signal transmitted between the intelligence signals and background noise signals.

In a conventional facsimile system an original document is scanned by a sharply focused light spot from a light source such as the electron beam cathode ray tube. The reflected light from the document scanned is intercepted and translated into electrical picture signals by photomultiplier tube. The intelligence bearing electrical picture signal is, in turn, transmitted to a receiving station in a remote location. At this station, the electrical signal is used to modulate a similar scanning beam of a cathode ray tube in an optical system. Finally, in a read station, that in most instances would be a photosensitive reproduction system, the modulated scanning beam is translated into a facsimile of the original document.

In the facsimile systems that utilize a sharply focused light beam for scanning the document, a photomultiplier tube is adapted to translate the light images reflected from the document being scanned into electrical signals. The undesirable characteristic inherent with the photomultiplier tube and the attendant circuits is that it cannot adequately distinguish between the light modulations representing a relatively dark background and the printed intelligence on the document. The presence of a dark background on the document may simply comprise colored paper. In other instances, the documents to be transmitted may have a white background with a colored portion inked thereon—with printed material being present in both the white and colored portions. In the transmission of the documents the darker background would be transmitted as "black" with the resultant loss of the printed material associated with the darker background.

To overcome this difficulty with the prior art system, manual controls have been provided in an attempt to electronically adjust the contrast sensitive parameters to produce a white copy for darker background portions of the document being scanned. This is a compromise, however, and may result in the printed matter being lost on the darker background—especially in those situations where the image density of the printed matter very nearly resembles the darker background. There is required, therefore, in this manner of background control, the continuous observance of an attendant to adjust the system for each document being transmitted.

The present invention overcomes the above-noted disadvantages by maintaining relatively constant the background level of the video signal for any particular scanned document, and instantaneously adjusts the background levels of the image video signals for changes resulting from different document backgrounds. In this way, the amount of background noise is minimized that may be reproduced on facsimiles. Specifically, the video signals (intelligence conveying signals) are automatic and continuously measured and modified to provide a composite video signal without a loss of intelligence to the read station—irrespective of changes in noise levels and color background changes in the document being scanned.

It is accordingly the principal object of the present invention to improve facsimile transmission and receiving systems by accurately distinguishing in the video signals transmitted between intelligence and background changes.

It is a further object of the present invention to provide a facsimile reproduction system that is operative to respond to a variation in background color contrast of the document being scanned without a loss of signal either in the light or dark areas.

Another object of the present invention is to maintain the background level of the video signal in a facsimile system relatively constant for any particularly scanned document.

A further object of the present invention is to provide a video signal in a facsimile system that rapidly responds to changes in background of different documents scanned.

Other objects and further features of the invention will become apparent with reference to the following detailed description of the invention when taken in conjunction with the accompanying drawings wherein.

Figure 1:
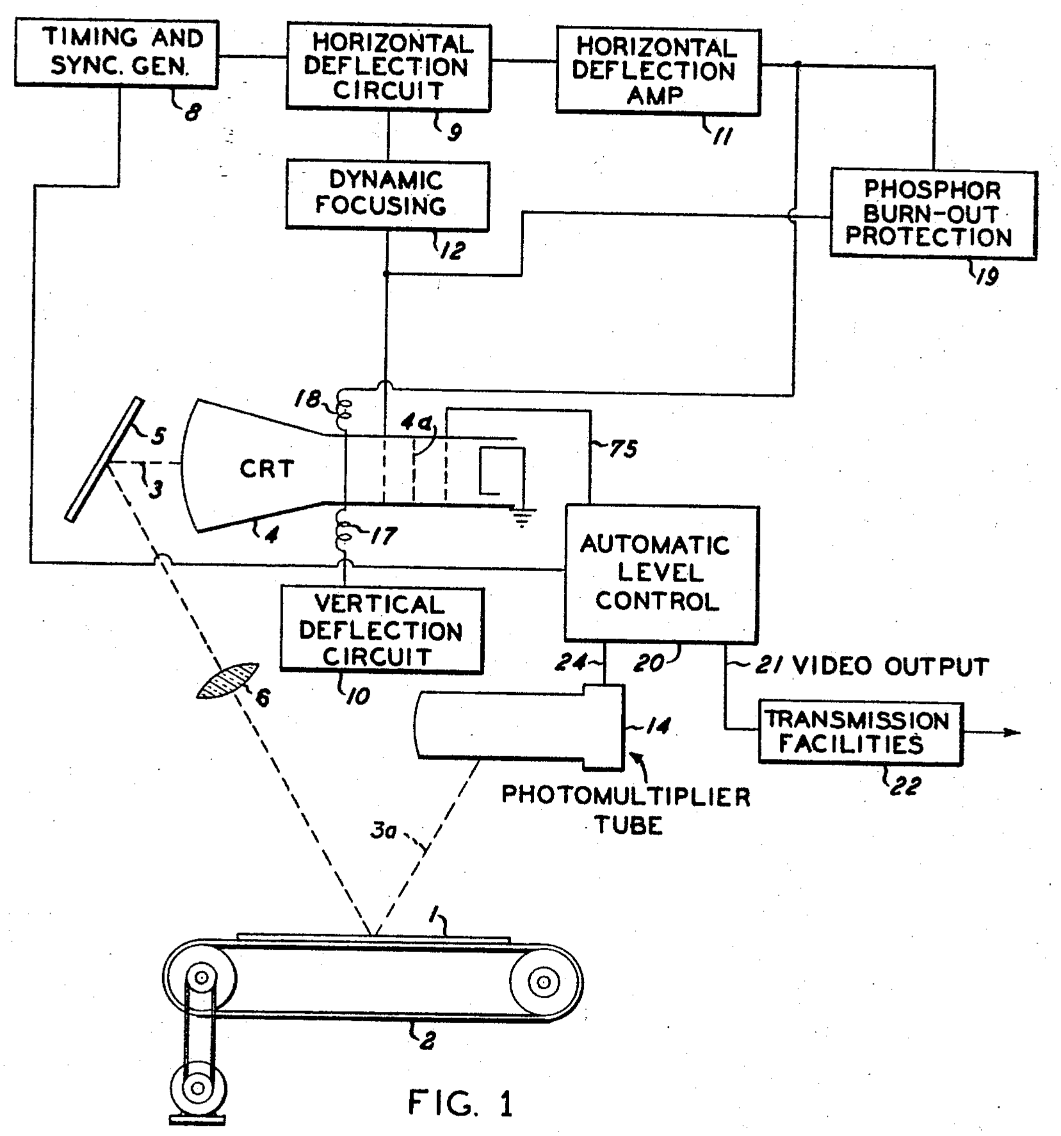
FIG. 1 is a schematic representation partly in block of the present invention incorporated into the scanning and transmitting section of a facsimile reproduction system.

There is illustrated in FIG. 1 a schematic representation partly in block of a facsimile system including the scanning apparatus and its associated transmitting section. In accordance with the general operation of this system, document 1 is moved through a predetermined path, at a fixed speed, by a conveyor 2 to traverse a light beam 3. The light beam 3 originating in a cathode ray tube 4 is reflected off a mirror 5 through a lens 6 and into a surface of the document 1. As the light beam 3 traverses document 1, line per line, modulated light is reflected from the document along path *3a* to the photomultiplier circuit 14. The photomultiplier circuit translates the reflected light from the document into an electrical signal corresponding to the light intensity. The signal generated from the photomultiplier 14 by the impingement thereon of the light image from the document 1 is fed to the automatic level control 20, by way of a conductor 24. The photomultiplier output signal is amplified and modified in accordance with the present invention as set forth hereafter in the automatic level control 20. The automatic level control 20 also receives a sync burst and a blanking signal from the timing and sync generator 8. The output video signal is, therefore, a composite signal that is fed directly to the receiving unit, or by line 21 to a suitable transmission terminal facility, generally indicated by the numeral 22.

The operational circuits of the cathode ray tube are, per se, conventional and may include a timing and sync generator 8 operative to emit a pulse to regulate the operation of the horizontal deflection circuit 9. The signal output of the horizontal deflection circuit 9 is amplified by the deflection amplifier 11 and fed to the horizontal deflection yoke 18. The vertical deflection circuit 10 having its output connected to vertical deflection yoke 17 controls the vertical location of the light spot in the CRT 4. The light spot is not deflected in a vertical direction in the normal operation of a facsimile reproduction system and the vertical deflection is provided to allow the light spot to be moved up or down on the face of the CRT to correct for optimum scanning and to minimize spot burnout on the tube face. Phosphor burnout protection is also provided by circuit 19 between the deflection yoke 18 and the high voltage supply. The function of the phosphor burnout circuit is to insure that the high voltage supply will be cut off from the CRT 4 if, for any reason, the sweep circuits for the light spot fails.

The dynamic focusing circuit 12 provides a focusing adjustment of the light spot on the CRT 4 so that the electron beam size is uniform through an entire scan. The beam of light emitted by the phosphor would normally vary between the center of a scan and the ends of a scan due to the greater focal distance traveled by the electron beam in passing from the center of the tube face to the ends. The dynamic focusing circuit applies corrective measures to the focusing electrode in response to the deflection signal from the deflection circuit 9. The voltage generated by the photomultiplied tube 14 in response to the modulated light beam from the document 1 becomes more positive as the scanned portion of the document gets darker and, conversely, as the document becomes whiter, the generated signal becomes more negative.

Figure 2:
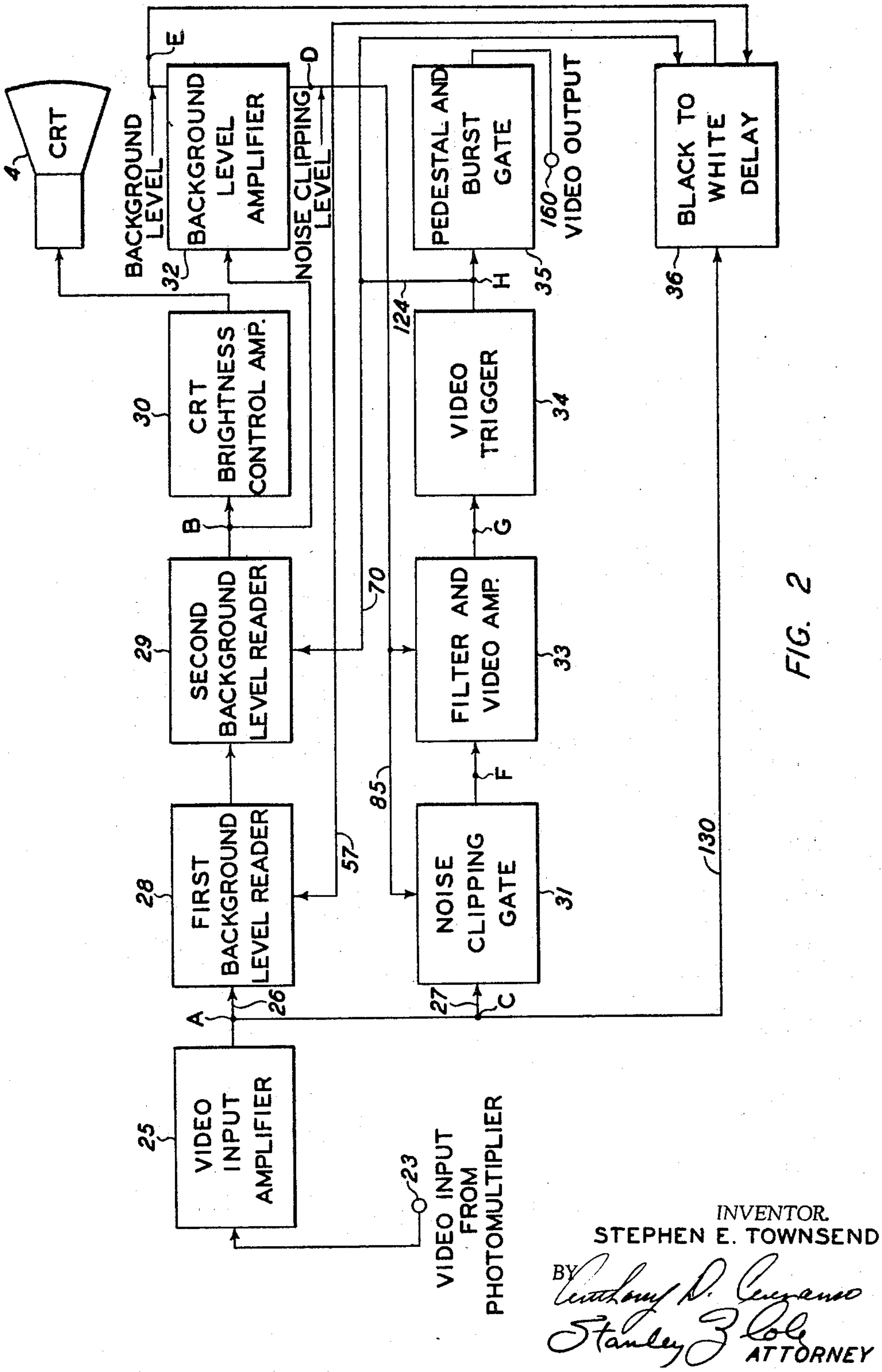
FIG. 2 is a schematic representation in the form of a block diagram of the automatic level control of the present invention.

Referring now specifically to FIG. 2 the control 20 is illustrated in expanded form. The signal at terminal 23 from the photomultiplier circuit 14 is fed into a video amplified 25. The amplified signal is then conducted into two major branches of the control 20 by way of conductors 26 and 27. In the first branch, the composite signal is fed to a first background level reader 28 wherein the signal is measured to determine the voltage level of that portion of the waveform which represents background noise.

The output from the reader 28 is then conducted to a second background level reader 29 where a further refinement relative to background noise of the measurement of the first reader is made. In effect, the two background level readers 28 and 29 measure and store the voltages portions of the video input signal being designated as background. That is, the two background level change circuits 28 and 29 are operative to determine whether background level changes are intelligence signals, noise, or a change in background. The circuits are further adapted to respond to changes in background level and to automatically compensate therefor. The specific operation of these two background level reader circuits is similar except that certain of their respective time constants are different. In this way, the circuits provide a slow response to changes of background as may occur from document to document and also a fast response to fast changes in the background level such as may occur on a single document.

The resultant signal from the background level readers is utilized in the CRT brightness control amplifier 30 to vary the brightness of the CRT to compensate for variations of the document background. This measured background voltage operates amplifier 30, which in turn varies the brightness of the CRT 4 to maintain the background voltage at a constant level. It will be apparent then that the circuit 25, the level readers 28 and 29 and the control 30 in conjunction with the CRT 4 and the photomultiplier comprise a closed electro-optical loop. This control loop is operative to compensate for variation in the brightness of the CRT in accordane with the variations in the intensity of the light images caused by the background changes emanating from the document during scanning thereof.

In the other branch of the automatic level control 20, the output of the video amplifier 25 is fed to a noise clipping level gate circuit 31. This gating circuit is operative in conjunction with the background level amplifier 32 to modify the video signal to eliminate the background noise from the composite signal. There is established at the output of this circuit a signal indicative only of the intelligence information in the document that is desired to be transmitted. The signal from the circuit 31 is conducted to a filter and video amplifier 33 where there is separated and amplified the alternating current component of the video signal. This component may comprise the minute signal produced by scanning images that approach the limit of resolution of the scanning system. The amplified video signal is fed into a video trigger circuit 34 where the video signal is converted from analog to binary. In burst gate 35 the binary signal is gated with a blanking pedestal and sync burst circuits to produce a composite video signal suitable for transmission.

The video signal output of the video amplifier 25 is also conducted to black to white delay circuit 36. The black to white delay circuit 36 compares the composite video input signal with the signal from the video trigger circuit 34. The modified video signal is then utilized as the control signal to the background level readers 28 and 29 to permit the reader circuits to determine which part of the video signal is to be considered background.

The specific circuitry and operational details of the automatic level control 20 may now be described in conjunction with the schematic circuit of FIG. 3 and the waveforms illustrated in FIGS. *5a* through *5d* and *6a* through *6d*. In order to facilitate the description of the circuits and functions therefor and to extract a better understanding of the present invention, certain parameters and supply voltages have been assigned to the circuits. It is to be understood that these voltages are purely exemplary and are not to be considered as limitations to the present invention. For example, the various component circuits associated with the automatic level control 20 are supplied with −12 volts bias voltage; also, the circuits are adapted to control the brightness of the CRT 4 for background "noise" that varies between approximately the −9.5 volt and the −10.5 volt levels of the video signal. In other words, the circuit parameters are chosen so that background changes can only occur in this predetermined range for effective control of background by the CRT loop.

Figure 3:
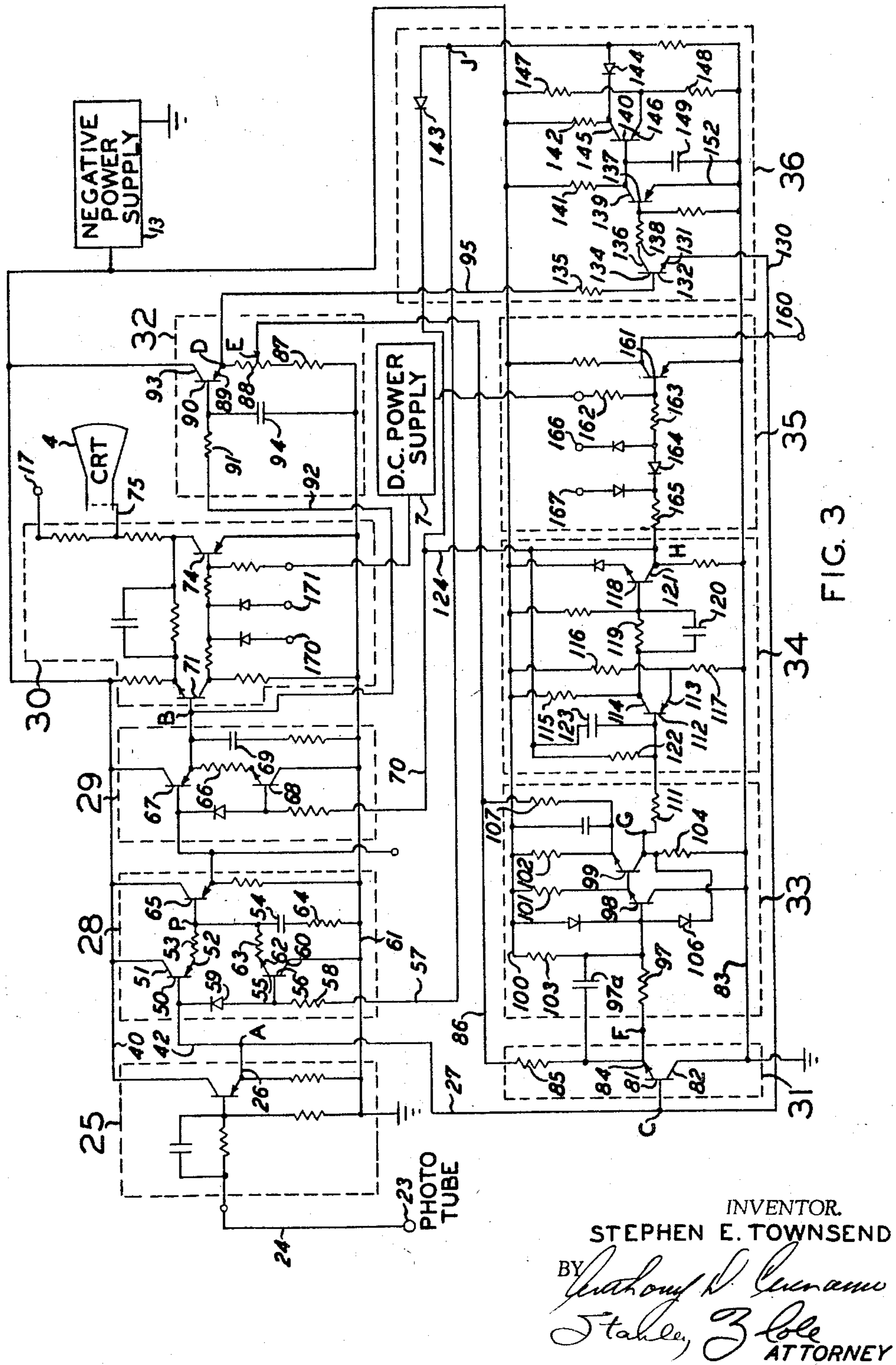
FIG. 3 is a circuit diagram of the automatic level control of FIG. 2.

As shown in FIG. 3, the photomultiplier output is conducted to the video amplifier 25 via a terminal 23 from photomultiplier tube circuit 14 (FIG. 1). Preferably, the video input amplifier 25 is an emitter follower for presenting a high impedance to the photomultiplier tube 14. The amplifier 25 may be of the conventional type utilized with photomultiplier tubes and is supplied with −12 volts from supply 13 through a supply conductor 40. The circuit is operative to amplify the periodic signal generated by the photomultiplier tube 14.

The amplified video signal is fed by way of the conductor 26 to the input conductor 42 of the first background reader 28. At point A in FIG. 3, the video signal entering the reader circuit 28 has a waveform such as that shown in FIG. *5a*. This signal will vary between zero voltage or ground potential and −12 volts with the peaks of the signal indicating black or dark areas of the document, i.e., written or printed characters, diagrams, etc. The typical video signal includes voltages representing background noise 44, character information 45 that is desired to be transmitted, solid material of intelligence 46, and some high resolution material 47 that may appear on document 1 as a series of closely positioned lines or fine print. The signal also includes voltages 48 illustrating general background and voltages 49 which are shifted slightly toward ground potential as indicative of two dark areas of document background. These two last named voltages will occur when the electron beam scans a document that may comprise labels, pictures, or other colored areas of the document.

As previously stated, the background level is allowed to vary within a range of approximately −9.5 volts to −10.5 volts for the parameters utilized in the automatic level control 20. Within this range, this background noise is clipped and does not appear as signal information in the output of the control 20. However, where the document being scanned includes portions that are darker than the general background of the document, which may be the result of colored areas, labels, etc., the resultant background level in the video signal may project to a level that extends out of the −9.5 volt to −10.5 volt range and if not properly distinguished may become transmitted as false intelligence material. In FIG. *5a*, the portion 49 is shown to include background noise as well as intelligence which is desired to be transmitted.

To assure that the background noise is not transmitted as intelligence, circuitry is provided to determine whether the voltage level changes are, in fact, intelligence noise or a change in background; and where it is determined to be a change in background condition, the circuit level is adjusted to eliminate this disturbance from the video signal. Specifically, the amplified video signal appearing at point A is fed by way of input conductor 42 to the first reader circuit 28. The conductor 42 is connected to the base of transistor 50 operative as an emitter follower. The collector 51 of this transistor is supplied with −12 volts from the voltage supply 13 and the emitter 52 is connected through a resistor 53 to one side of a capacitor 54. The base 55 of a second transistor 56 which serves as an emitter follower complementary to the emitter follower 50, is connected to a conductor 57 through a resistor 58. A diode 59 is connected between the bases of the transistors 50 and 56 and is arranged so that its cathode is connected to the base of the transistor 50 and its anode connected to the base of the transistor 56 and the resistor 58.

The collector 60 for transistor 56 is connected to a lead 61 which serves as the ground lead for the control 20. As was the case for transistor 50, the emitter 62 for transistor 56 is connected through a resistor 63 to the same side of the capacitor 54 as is the emitter 52 for transistor 50. A resistor 64 is connected between ground lead 61 and the other side of the capacitor 54.

The transistors 50 and 56 are arranged to complement one another to charge the capacitor 54 in a more negative or more positive direction. The transistor circuit 50 will always remain conducting, so that at any time the input to the base goes more negative than the voltage on the capacitor 54 at point P, say from −9.5 volts to −10.5 volts (which is indicative that the portion of the document being scanned is lighter than that just previously scanned) the capacitor 54 will be charged to that more negative voltage. In the event that the input to the base of the transistor 50 goes more positive, that is, from −10.5 volts to −9.5 volts, the capacitor will maintain the original charge of −10.5 volts.

The output of the capacitor 54 at point P is fed to the base of an amplifier transistor 65 which is utilized to present a high impedance load to the capacitor 54. The output is then fed into the second background reader circuit 29 which circuit is similar to the first reader circuit except that a single resistor 66 is connected between the emitters of complementary emitter followers illustrated as transistors 67 and 68. A capacitor 69 of higher capacitance than that of the capacitor 54 is connected between the emitter of the transistor 67 and the common ground 61. The relative capacitance value of the capacitor 54 to the capacitance of capacitor 69 is 1 microfarad to 10 microfarads. In all other respects, the operation of the level reader 29 is similar to the operation of the first reader 28 and differs therefrom in only one operational, important aspect. Since the capacitance of the capacitor 54 is relatively low, the action of the first reader upon the video signal is such that there is a faster response to different background than the response of the record reader. This has the effect that the loop is adapted to respond rapidly to abrupt changes in background.

In the background level circuits, a control input of −12 volts is available for both the anode of the diode 59 and the base of the transistor 56. However, as will be described hereinafter, the control input in conductor 57 is directly dependent upon the amplitude of the control input signal from the black to white delay circuit 36. Therefore, the control signal may vary from −6 volts to −12 volts dependent upon the degree of background in the video signal. When the portion of the document being scanned is determined to be background by the trigger circuit 24, the control input to the level reader 28 via the delay circuit 36 is more positive than −12 volts, that is, −6 volts. Therefore, the base of the transistor 56 and the anode of the diode 59 become more positive than the emitter 62 and diode cathode, thereby rendering this transistor and the diode conductive. This condition will permit more positive charging of the capacitor 54 through the transistor 56 by positive going inputs which represent less light on the photomultiplier 14 caused, in turn, by scanning darker backgrounds. When the control input in conductor 57 is −12 volts, both the diode 59 and the transistor 56 are back biased and taken out of the circuit. This permits only the transistor 50 to charge the capacitor more negatively with negative going inputs on the video signal when the signal input from circuit 36 represents black areas or intelligence material. In this condition, the capacitor 54 will not assume a voltage associated with a black area and will hold its charge remembering the last background scanned. This is indicated in FIG. *5a* wherein the background level 48 is below the intelligence 46.

The capacitors 54 and 69 in the two background readers 28 and 29 provide two fixed discharge time constants that satisfy two requirements of the reader circuits. The first requirement is that since the black or intelligence areas on a document may be a large part of a sweep in duration, the discharge time constant must be several times greater than the sweep time. With the long time constant, the reader circuits will be disposed to remember the level of the last background scanned rather than drift positive. The other requirement is that since the reader circuits must be prepared to follow changes in background level within a single sweep, such as changes in the output in the CRT 4 due to dynamic focus variation or changes in scanned background, the discharge time constant would have to be a fraction of the sweep time. To meet these two requirements background readers 28 and 29 are designed to have short and long discharge time constants respectively. The parameters of the circuits are such that the first reader circuit 28 charges or discharges the 1 mfd. capacitor 54 quickly, reading negative peaks or following abrupt changes in background. The second reader 29 charges or discharges the 10 mfd. capacitor 69 more slowly and, therefore, is capable of storing the background level that is present just preceding scanning of intelligence. For example, in FIG. *5a*, the background level 48 just preceding the intelligence 46 is maintained during the period the intelligence is being scanned, with the capacitor 69 holding its charge during this period. The output of the amplifier 30 is conducted to the grid of the CRT 4 by way of conductor 75. The bias supply 17 is connected to the control grid of CRT 4 for supplying the same with a bias voltage. Normally, the CRT 4 operates at a grid voltage of −50 volts and if the grid bias is varied toward −25 volts, the electron beam becomes more intensified to produce a brighter scanning light spot. For illustration purposes, the difference between the two extreme flat portions 48 and 49 of the waveform 72 in FIG. *5a* is approximately 1 volt, that is, the difference between −10.5 volts, indicative of the lower portion, and —9.5 volts, indicative of the higher portion. This one volt differential is amplified in amplifier 30 to a voltage of approximately 25 volts which is impressed upon the grid of the CRT to change its bias voltage from the normal —50 volts to —25 volts.

It will be apparent then, that any variation of the background of the document being scanned which will proportionately vary the background signal level between —10.5 volts and —9.5 volts will be reflected in the output of the reader circuits 28 and 29. This, in turn, will produce corresponding proportional changes in the bias of the CRT amplifier 30 and increase the change in the order of 25 times. The amplified voltage applied to the grid of the CRT 4 will cause the light spot of the tube to brighten if the bias goes more positive, that is, in the event the background level changes from the portions 48 to portions 49. With a brighter spot scanning the document, the phosphor screen becomes brighter along the electron beam path, thereby reducing the effect of a darker background which caused the background level to go positive in the first instance. In practice, limits are set to vary the light spot in brightness inversely in accordance with the background of the document being scanned. Beyond the darker limits of —9.5 volts, when the CRT bias is approximately —25 volts, the light spot will not further brighten; in fact, this would be the limit of the brightness control for the CRT 4 as determined by the amplifier 30. With a signal voltage more positive than —9.5 volts, the brightness control of the CRT will not be operative to further brighten the tube. The CRT 4 amplifier 30 comprises the two transistors 71 and 74 and has a maximum gain of approximately 25. The transistor 74 is supplied with +12 volts from the supply 7. The amplifier is adapted to proportionately vary the grid bias of the CRT 4 from —50 volts to —25 volts depending upon the voltage variation of the background level, which was established above at between —9.5 volts and —10.5 volts.

Also shown in FIGS. 2 and 3, the output for the photomultiplier amplifier 25 at point A is fed along the conductor 27 to the noise clipping gate circuit 31. Specifically, the conductor 27 is connected to the base of a transistor 81 at point C and thereby impresses upon the noise clipping circuit 31 the same video signal that is fed to the first reader 28. The waveform 43 of FIG. *5a* of the video signal present at point C is the same as that which is present at point A.

The transistor 81 of the noise clipping circuit 31 comprises a collector 82 connected to a common ground lead 83, and an emitter 84 connected to resistor 85 and by way of conductor 86 to a wiper arm 87 of a potentiometer 88 in the background level amplifier 32. In facsimile apparatus, noise from the accompanying photomultiplier, document paper texture, and other noise irregularities will occur at all voltage levels. The most predominantly objectionable is at the background level since it would be reproduced as black spots on the white background of the copy paper. In the background level control 20, this noise is automatically removed by clipping in the clipping circuit 31 at a voltage more positive than the background level 72. As the background level is not constant but may vary, the proper level at which noise clipping is accomplished, as illustrated by waveform 72*d* in FIG. *5a,* is a voltage which is more positive by a percentage (not a fixed amount) than the actual background level 72.

In the background level amplifier 32, one end of the potentiometer 88 is grounded to the ground lead 61 and the other end is connected to the emitter 89 of emitter follower transistor 90. This transistor circuit 90 has its base connected through a resistor 91 by way of conductor 92 to point B or the output for the second background reader 29. The collector 93 of the transistor 90 is connected to the power source 13 where it derives a —12 volt supply. In this arrangement, the background level voltage (72 of FIG. *5a*) on the capacitor 69, at point B, is impressed upon the background level amplifier 32 and, in turn, to the noise clipping gate 31 and the delay circuit 36. The voltage from point B is filtered by the RC network comprising resistor 91 and capacitor 94 and then passed through the emitter follower 90 to provide a high impedance load to the second level reader capacitor 69.

The background level voltage at point D will be slightly more positive than voltage 72 because of the slight voltage drop through the circuit 32. This voltage is also fed by conductor 95 to the input of the delay circuit 36 and to the potentiometer 88 to permit adjustment of this voltage by the wiper arm 87 in the noise clipping circuit 31. The voltage, illustrated by waveform 72*e* and appearing at point E on the wiper arm, is the noise clipping level and may be adjusted between the background level, illustrated as 72*d*, and —6 volts. The noise clipping voltage from the wiper arm 87 is conducted via line 86 to the emitter 84 of the transistor 81 in the circuit 31. All of the waveforms 72, 72*d* and 72*e* have approximately the same shape, as shown in FIG. *5a* and differ mainly in their respective positions toward the —6 volt level, as indicative of the voltage difference between the voltages they represent. The video signal at point C clipped by the noise clipping circuit 31 is combined with the voltage 72*e* from the background level amplifier 32 to produce at point F a voltage having the waveform 96. This waveform comprises that portion of either of the waveforms 43 and 72*e* which is the more positive at any one point in time, as illustrated in FIG. *5b*.

This output voltage illustrated by waveform 96 of FIG. *5b* is fed to the filter and video amplifier 33 through a filter network comprising a resistor 97 and capacitor 97*a*. From this network, the signal voltage is fed to the base of a transistor 98 which has its emitter connected to the base of a second transistor 99 of the amplifier 33. An electric potential of —12 volts for the emitters of the transistors 98 and 99 and the RC filter circuit is derived from the power source 13 through a conductor 100. Suitable resistors 101, 102 and 103 are interposed in these circuits, and each of the transistors are grounded to the ground lead 83 with the transistor 99 being grounded through a resistor 104.

The effect of the filter and amplifier circuit 33 upon the video input signal is to invert the signal, that is, where the portion of the document being scanned is white, the output signal of the amplifier appearing at G will become more positive toward zero potential and, conversely, as the document portion becomes darker or black, the signal voltage will become more negative with —12 volts being maximum with a black document portion. In FIG. *5c* there is shown a waveform 105 of the video signal voltage as it appears at point G. In operation, the video amplifier 33 in a preferred embodiment has a D.C. gain of 1. In the event that a wide dark area is being scanned, there is produced a —5 volt signal at point F; the resultant output signal at point G will be —7 volts in view of the signal inversion through the amplifier. The amplifier also has an A.C. gain at 100 kc. of 10 so that a video signal representing high resolution or fine print near enough to the limit of the scanning system and having an amplitude of only 2 volts peak to peak, would be reproduced. This portion of the video signal, that is, the portion representing high resolution or fine print approaches a sine wave having less peak amplitude than would result from other intelligence of the same contrast on the document. The noise clipping gate 31 will remove the more negative one volt peak leaving the more positive one volt peaks to be detected. In this way, the A.C. gain of 10 would provide a 10 volt peak to peak signal for these detected one volt peaks to the video trigger circuit 34 at point G. In the filter and video amplifier 33, a diode 106 clamps the base of the transistor 98 from going more positive than the voltage required to turn on the transistor 99. There is thus assured that a high D.C. component in the video signal will not saturate the amplifier making it insensitive to small A.C. components, produced from the initial few cycles of high resolution or from very fine print.

The output of the amplfier 33 at point G is fed through a linking resistor 111 to the base of a transistor 112 in the video trigger circuit 34. An emitter 113 and a collector 114 for the transistor are connected to the voltage supply conductor 100 through resistors 115 and 116, respectively. The emitter 113 is also connected to the ground lead 83 through a resistor 117. The collector 114 of the transistor 112, is connected to the base of a transistor 118 through an RC circuit having a resistor 119 and a capacitor 120. Connected in parallel between the base of transistor 112 and the collector 121 of the transistor 118 at point H is an RC circuit comprising a resistor 122 and a capacitor 123. A conductor 124, connected to the conductor 70, impresses the output of the trigger circuit 34 as the control input to the second background reader 29.

In operation the video trigger circuit 34 converts the video signal from an analog to a binary signal. The binary video signal output from the circuit 34 will have amplitudes of equal heights where white equals 0 volts and black equals —12 volts. This is illustrated in FIG. 5*d* as wave form 125 that will appear at point H, the output point for the trigger circuit 34. The video signal at point H is indicative of the intelligence that is derived from the document 1 with the more negative peaks 45 indicating characters or points on lines being scanned, peaks 46 indicating wide lines or areas and peaks 47 indicating high resolution intelligence, such as closely spaced lines or fine print. The other portions of the waveforms 125 which are flat and horizontal are indicative of the document background and the fascimile of this background will be white. Peaks 45, 46, and 47 will appear black on the transmitted facsimile.

Figure 5A:
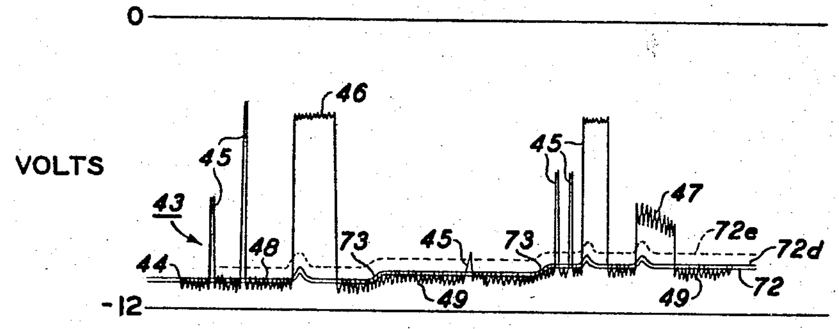
Figure 5B:
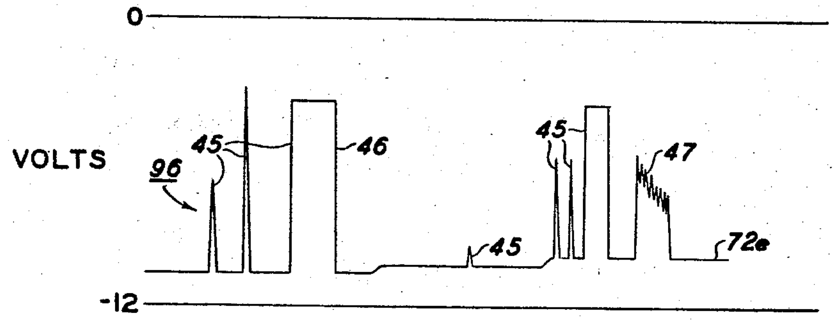
Figure 5C:
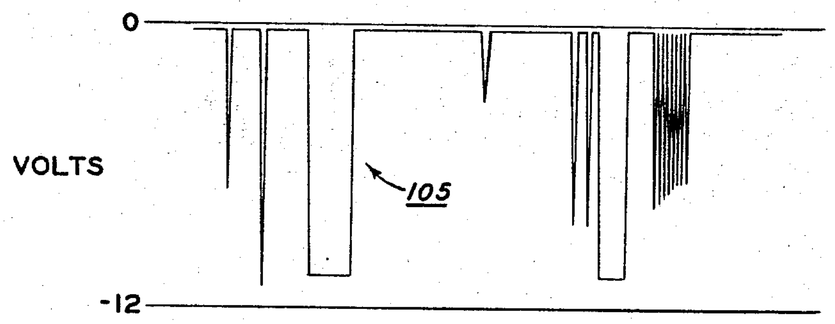
Figure 5D:
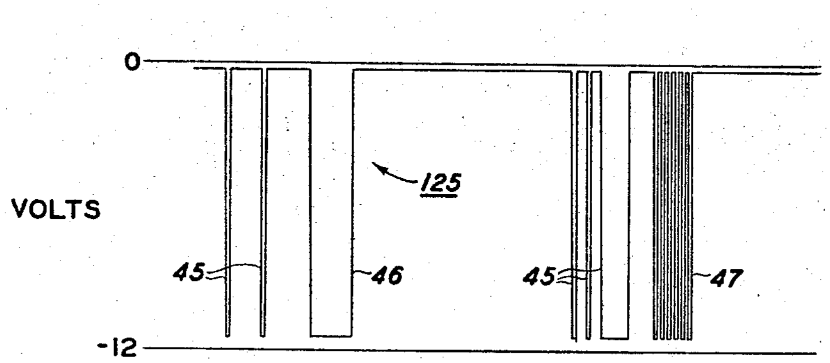

It will be noted that the output at point H does not include provisions for the changes in document background from lighter to darker areas, as was illustrated in FIG. 5*a* with portions 48 and 49 of the background level. The various parameters of the trigger circuit 34 are such that the transistor 112 will conduct when the input at point G is more negative than —4 volts. In studying FIGS. 5*c* and 5*d*, those peaks of waveform which illustrate the voltage at point G, that are more negative than —4 will result in the waveform 125 in FIG. 5*d*, this action being caused as the transistor 112 conducts.

The function of the trigger circuit 34 is to determine whether that portion of the document being scanned is black or white. The output of the trigger circuit is applied to the second background reader 29 from point H by the conductors 124 and 70 as a control input. When the signal at point H is as near zero potential as described above, the transistor 68 will conduct with the result that the charging of the capacitor 69 will be accomplished through the transistor 68. This condition will occur when white background or some slightly darker background is being scanned. On the other hand, as the black portion of the document is scanned, a signal of —12 volts or near this value will be applied as a control input for the second reader circuit. This trigger signal will cause the transistor 68 to be effectively taken out of its circuit. During this operation, the background level control as evidenced by the portions 48 and 49 of waveform 72 under the intelligence 45, 46, and 47, will continue to be generated so that the grid of CRT 4 will not be influenced by the scanning of the black portion of the scanned document that is indicative of intelligence.

The original video signal appearing at point A is also conducted to the delay circuit 36 by a conductor 130 which connects point A to the emitter 131 of transistor 132 in this circuit. The conductor 95 connects the base 134 of the transistor 132 through a resistor 135 to point D of the emitter 89 of the transistor 90 for the background level amplifier 32. The collector 136 for the transistor 132 is connected to the base of transistor 137 through a resistor 138 and the collector 139. The collector 139 is connected at its other end to the base of a second transistor 140. Each of the transistors 137, 140, has its respective collectors connected to the —12 volt power source 13 through load resistors 141 and 142. The output for the delay circuit is taken from the junction point J between a diode 143 in the conductor 124 and a diode 144 connected to the collector 145 of the transistor 140. The diodes 143 and 144 comprise a negative "or" gate which is adapted to receive an input from the trigger circuit 34 by way of the conductor 124 and from the transistor 140 by way of the collector 145 to present the delay circuit output at the point J. This output varies between —6 and —12 volts and is conveyed by way of the conductor 57 as the control input for the first reader circuit 28. The emitter 146 for the transistor 140 is connected to the junction of two resistors 147 and 148 of equal resistance which are connected in series between the ground 83 and the power supply line 100 to present the emitter with —6 volts. To complete the delay circuit, a capacitor 149 which is normally charged to —12 volts through the load resistor 141 is connected between the ground line 83 and the emitter 139 of the transistor 137.

The purpose of the black to white delay circuit 36 is best demonstrated by examining in FIG. 6 the video output of the video trigger circuit 34 representing high resolution. Closely spaced vertical lines or fine print on the document near the limit of resolution of the scanning system produces a video input signal which approaches a sine wave. Also, the waveform is less in amplitude than would result from scanning the same optical contrast of alternate larger areas. For this reason, the negative excursions of the video input signal representing high resolution or fine print are not as negative as those produced by plain background. It will be noted, the negative going peaks or excursions do not extend downward as far as they would if a single line or point is scanned. From this, it can be seen that the control loop would try to readjust the CRT 4 brightness to bring the negative excursions of the high resolution signal down into the control range or within the envelope of the background level 72*d*. In operation, the black to white circuit 36 by comparing the video signal with the background level voltage, modifies the video trigger circuit 34 output used as the control input to the first background level reader 28. In this way, the noise clipping level of the first background level reader 28 distinguishes between noise and high resolution signals.

Figure 6A:
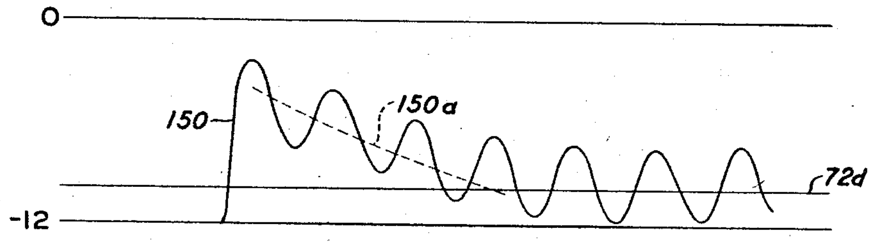
Figure 6B:
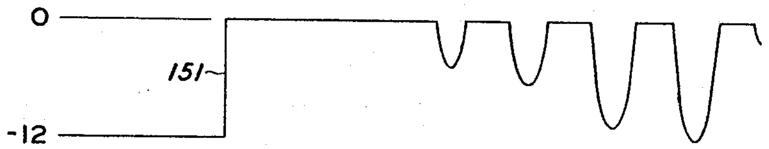

In order to facilitate description of the function of the delay circuit 36, the high resolution signal portion 47 of FIG. 5*a* has been expanded as shown in FIG. 6*a*, and the following description will concern the function of the delay circuit 36 on this portion of the video signal. In FIG. 6*a*, the waveform 150 illustrates the expanded waveform of portion 47 at point A caused by the scanning of high resolution portions of the document. When an area of high resolution is encountered during a scan, the corresponding video signal 150 above the background level is more positive than the background level 72*d*, resulting in the emitter 131 being more positive than base 134 and a non-conductive state of the transistor 132. When the signal 150 extends below the background level 72*d*, the transistor 132 conducts causing the transistor 137 to conduct. Up to this time, the transistor 140 is conducting to produce a —6 volt control signal. This signal when applied as a control input to the first background level reader 28 will have the same waveform as the video trigger circuit 34 output. Under these conditions, the CRT 4 brightness control loop will act to readjust the background level 72*d* and tend to place this level almost half way up the video signal 150. The negative peaks of signal 150, below the background level 72*d* are amplified by the transistor 132 to produce on the collector 136 a voltage having the waveform 151 in FIG. 6*b*.

As the successive negative peaks of the video signal that are present on the emitter 131 begin to fall below the background voltage 72*d* for increasingly longer periods of time, the transistor 132 and in turn, the transistor 137 are made to conduct for increasing durations for the corresponding negative peak. This action produces a signal on the collector 139 having the waveform 152 in FIG. 6*c*. Since the emitter 146 of the transistor 140 has a potential of −6 volts, see curve line 153, the transistor 140 remains conductive when its base is more negative than −6 volts which occurs when the transistor 137 is not conducting or is conducting and its base is at −12 volts due to the −12 volt charge on the capacitor 149. Conduction of transistor 140 results in a signal on the collector 145 having waveform 154 of FIG. 6*d*. When the transistors 132 and 137 are made to conduct, the average voltage on the capacitor 149 which is normally charged at −12 volts, becomes more positive than −6 volts resulting in the transistor 140 being turned off. When the transistor 140 is turned off, the output thereof becomes −12 volts and serves as the control input to the first reader 28 for preventing the CRT 4 brightness control loop from following the changes in the document. As the peaks of the signal pulses extend above the background level and the transistor 137 reverts back to a non-conductive condition, there is a delay in the time when the transistor 140 commences conduction because of the time constant in the RC circuit 141, 149. For each excursion below the background level, the diode 144 remains turned off for a greater part of the time, as noted by the successively longer negative peaks M in the waveform 154.

Figure 6C:
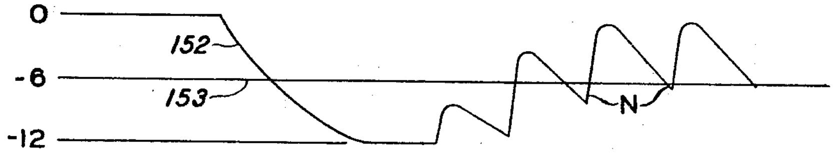
Figure 6D:
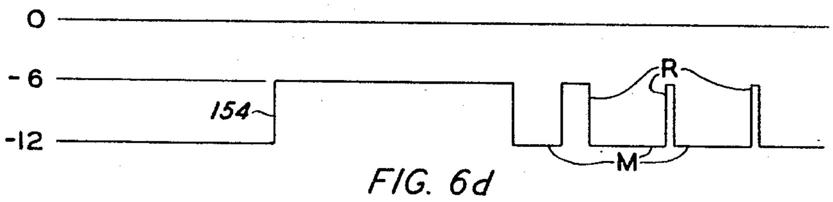
Figure 6E:
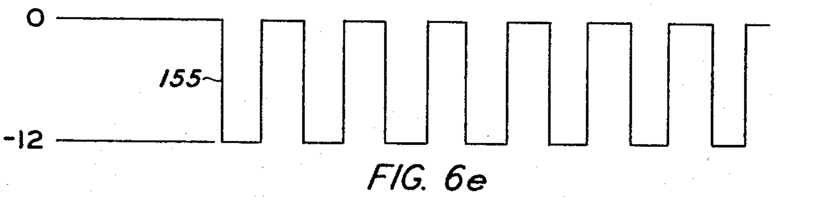

In comparing the waveform 154 with the waveform 150, it will be noted that the further the video negative going peaks extend below the line **72*d***, the less peaks N of FIG. 6*c* of the collector 139 voltage extend below the −6 volt limit and, as the time periods become shorter for the peaks N to remain below the limit, the narrower the positive going peaks of the waveform 154 of FIG. 6*d*.

Figure 6F:
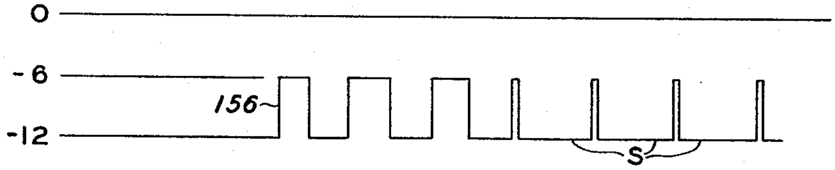

The output of the transistor 140 at the collector 145 (waveform 154) together with the video trigger output through the negative "or" gate (diodes 143 and 144, point J having waveform 155) remains at −12 volts a greater part of the time, thus decreasing the tendency of the first background level reader to follow positive going signals. Waveform 156, FIG. 6*f*, illustrates this signal which serves as the control input for the first reader circuit 28. The black to white delay in the control input presented to the first reader circuit is shown by the successively longer periods in the negative peaks of the waveform 156. As a result of this delay, the CRT 4 brightness control loop comes to balance with the negative going peaks of the video signal 150 for the high resolution scan at or slightly below the background level **72*d* (see waveform 150*b*** in FIG. 6*a*).

As previously stated, when the control input to the reader 28 is more positive than −12 volts, that is, the scanned background is black, the base of the transistor 56 and the anode of the diode 59 become more positive than the emitter 62 and the diode cathode, respectively, thereby rendering this transistor and the diode conductive. Such conduction will permit charging of the capacitor 54 in a more positive direction which indicates that a darker background on the document 1 is being scanned, in this case, high resolution or fine print which will resemble a darker background.

With the negative going peaks of the signal riding on the background level **72*d***, as shown in FIG. 6*a*, the noise clipping level **72*e*** is adapted to clip the negative going peaks leaving the positive going peaks as representative of the high resolution intelligence. In effect then, the noise clipping level distinguishes between the noise pulses in the video signal and the signal pulses that are indicative of high resolution intelligence when these signal pulses are pulled up so that the signal pulses are riding upon the background level as shown in FIG. 6*a*. This will result in a video output signal 155, that will be a high quality in regard to the portions thereof representing high resolution or fine print and which will be suitable for facsimile transmission.

From the foregoing, it is seen that the component circuits of the automatic level control 29 are capable of automatically controlling the brightness of the CRT 4 in the event that background levels of the document vary within certain limits and to eliminate background noise. These component circuits are also capable of distinguishing whether a portion of the document being scanned is the result of background changes or character intelligence, especially where the intelligence possesses high resolution. In these instances where the portion being scanned is black or dark, but not a darker background, for instance, where the video signal at point A has a peak of −5 volts, the peak at point C also becomes −5 volts. After being amplified in the filter and video amplifier circuit 33 and inverted in the trigger circuit 34, the signal at point H, the output at the latter circuit will reflect high peaks, toward the −12 volt limit, for the black or dark portions of the document being scanned. It is in this manner that trigger circuit 34 determines that this portion of the scanned document is black or dark and not the result of a change in background. The resultant voltage is fed from point H by the conductor 124 through the diode 143 of the negative "or" gate. The signal is then modified by the delay circuit 36 output to produce the control input for the first reader circuit 28. This control input results in rendering the transistor 56 of the first reader 28 non-conductive. Under this condition, the background level control will ignore this portion of the video signal and will not attempt to vary the grid bias of the CRT 4. In FIG. 5*a* it will be noted that the character intelligence 45, 46 and 47 have protruded above the background level 72. This action of the trigger circuit will result in maintaining the brightness of the CRT at the level that was present immediately preceding the scanning of the black or dark portion of the document.

In those instances where a background change is being scanned and there is a sharp increase in the amplitude of the video signal at point A (points 73 on the waveform of FIG. 5*a*) the trigger circuit will determine whether this sharp rise is indicative of a background change or the introduction of character intelligence. The parameters of the background readers 28 and 29 were chosen so that background level changes produce a video signal having amplitudes that vary between −9.5 volts and −10.5 volts. Therefore, for that portion of the scanned document that results in the signal voltage change that falls within this range, the brightness of the CRT electron beam will have a brightness that is inversely proportional. On the other hand, if the signal voltage change results in a voltage that is more positive than −9.5 volts, the brightness will not be affected or the upper limit of the brightness control has been reached. When the signal voltage reaches approximately 7 volts, the scanned document portion will be seen as black by the trigger circuit 34 in conjunction with the noise clipping level circuit 31 and the delay circuit 36.

The final video signal that is adapted for transmission to a receiver to be converted thereby into images suitable for reproduction purposes is taken from the output terminal 160 of the pedestal and burst gate 35. The terminal is connected to the collector of an amplifier transistor 161 which has its collector supplied with −12 volts from the source 13 and its base connected through a resistor 162 to a source 7 of +12 volts. This base is also connected through a resistor 163, a diode 164 and a resistor 165 to the output of the trigger circuit 34 at point H. On the side of the diode 164 adjacent the anode thereof, a terminal 166 is provided for connection to the timing and sync generator 8 to permit the introduction of the sync signal into the gate 35. Pedestal pulses from the generator 8 are introduced on the other side of the diode adjacent the cathode thereof, by means of a terminal 167. Since the use of pedestal pulses and the sync signals in the gate circuit 35 in conjunction with the video signal will be apparent to those skilled in the art, there is no need for further discussion thereof. The composite video signal taken from terminal 160 is fed to a suitable transmission facility 22 by the lead line 21.

The timing and sync generator 8 is also connected to terminals 170 and 171 in the CRT brightness control amplifier and these terminals are positioned between the output collector of the transistor 71 and the input base of the transistor 74. With this arrangement, the blanking signals from the generator 8 may be impressed on terminals 170 and 171.

Figure 4:
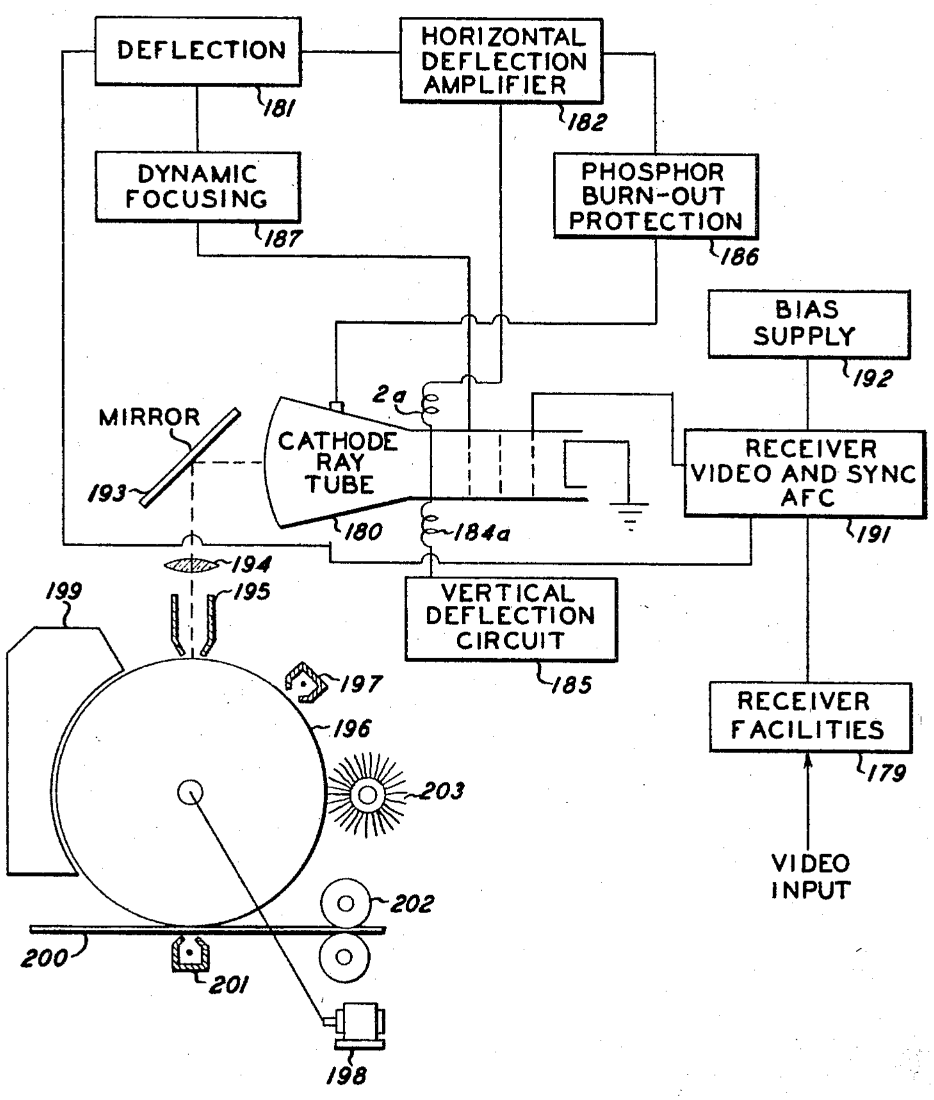
FIG. 4 is a schematic representation in the form of the receiving and recording section of the facsimile reproduction system of FIG. 1; and, FIGS. *5a* through *5d* and *6a* through *6d* are diagrams of illustrative voltage waveforms as they appear at various points along the circuitry of FIG. 3.

The invention disclosed is suitable for use in transmitting apparatus which produces signals that may be transmitted by any of the common carriers available or by individually owned microwave or coaxial cable. As shown in FIG. 4, the transmitted video signal is received by a suitable receiving terminal facility 179 which includes the usual demodulators, transformers, etc. to condition the incoming video signal for utilization by the receiver unit shown in FIG. 4.

The cathode ray tube 180, used in the receiving and recording or printout unit shown in FIG. 4, operates in much the same way as the cathode ray tube of the scanning unit shown in FIG. 1. The cathode ray tube 180 has a horizontal deflection circuit 181 and a horizontal deflection amplifier 182. The output signal of the deflection amplifier 182 is fed to the deflection yoke 184 and controls the horizontal scan of cathode ray tube 180. The scan of the light spot from the cathode ray tube 180 is the same type of single line horizontal scan as in the transmitting unit. To permit vertical positioning of the spot, a vertical deflection circuit 185 supplies a signal to the deflection yoke 184 controlling the vertical location of the light spot and scan line in tube 180. There is a phosphor burnout protection circuit 186 and a dynamic focusing circuit 187 that function in the same manner as previously described for the transmitting unit. Also, a high voltage supply 189 supplies voltage to the tube anode and to the focusing electrode. Likewise, screen supply 190 controls the potential on the screen grid.

The composite video and sync signal from the receiving facility 179 is fed to a received video and sync automatic frequency control circuit 191 where all the necessary action is performed for permitting the CRT 180 to present video information for reproduction purposes. Included in this information is the pedestal and sync burst signals for the circuits 181 and 182 to provide proper timing so that the sweep of the spot in the CRT 180 is synchronized with the sweep of the spot on the transmitter CRT 4.

A suitable reproduction apparatus that may be utilized to reproduce the facsimile signal produced by the cathode ray tube 180 is the xerographic reproduction apparatus unit shown in FIG. 4. In this arrangement the light spot is reflected by a mirror 193 through a lens 194 and a light shield 195 onto the surface of a xerographic drum 196. The xerographic drum 196 contains a photoconductive surface which has the ability of retaining an electrostatic charge on the surface when the surface is kept in darkness and of discharging the electrostatic charge through to a conductive base beneath the photoconductive surface when the drum surface is exposed to light. Photoconductive materials, such as for example, selenium, have the characteristic of being an insulator in darkness and a conductor when exposed to light. Thus, when the xerographic drum 196 is shielded from outside light and an electrostatic charge is placed on the surface by corotron 197, a latent electrostatic image is generated on the surface of the drum by the sweep of the light spot from cathode ray tube 180 through lens 194. As the light spot sweeps longitudinally across the drum surface, the electrostatic charge on the drum surface is discharged at the points that the light spot is on in response to the signal received by the receiver circuit 191, and the drum surface retains the electrostatic charge at the points that light spot is off. The drum 196 is rotated by a motor 198 at a speed which provides linear movements of its surface in synchronization with the linear movement of the document 1 on conveyor 2 of the transmitter unit. Thus, each sweep of light from the cathode ray tube 4 in the transmitter across the surface of document 1 corresponds to the same sweep of light from cathode ray tube 180 across the drum surface 196 and the same linear distance between sweeps on the document and the drum surface is maintained.

The latent electrostatic image on the drum 196 moves as the drum is rotated through a developer apparatus 199 which applies an appropriately charged toner or developer powder to the surface of the drum. The powder adheres to the areas of the drum surface which have been discharged by the cathode ray tube 180 exposure and does not adhere to areas of the surface which contain the initial electrostatic charge. Thus, there is developed a powder image of the original document 1 on the surface of the drum 196. The drum continues to rotate so that the powder image is brought into surface contact with a web or sheet material 200, usually paper. The powder image is transferred to the web 200 by applying an electrostatic charge to the underside of the web by a corotron 201. The electrostatic charge from the corotron 201 attracts the powder from the surface of the drum 196 onto the web 200. The web 200 is then passed through a fusing device, herein shown as heated pressure rollers, but which may be any suitable fusing device, such as an electric heater or a vapor fuser, both commonly known in the art of xerography. The drum continues to rotate past a cleaning brush 203 which removes any residual powder left on the drum surface. The drum is then ready to receive another electrostatic charge from corotron 197 and a new image from the cathode ray tube 180. It is obvious that this is a continuous process and that while an image is being developed, transferred and fused, a new image may be placed on the drum surface. The particular type of charging, developing, transferring, fusing and cleaning shown herein is for illustration purposes only. It is obvious that any of these may be suitably replaced by other well-known xerographic techniques.

While the present invention, as to its objects and advantages as described herein, has been carried out in a specific embodiment thereof, it is not desired to be limited thereby, but it is intended to cover the invention broadly within the spirit and scope of the appended claims.

What is claimed is:

1. In a facsimile communication system for transmitting video signals representative of the light values of intelligence on a document, a transmitter comprising:

a light source image scanning means for repeatedly scanning successive parallel line paths across the document with a light spot, photomultiplier means responsive to the reflected light from the document for producing video signals in accordance with the reflected light values indicative of the intelligence and the background on the document during each scan of said scanning means, background reader circuit means coupled to said photomultiplier means for establishing a background level voltage in response to the video signals indicative of the background light values on the document, said background reader circuit means comprising first storage means for storing said background level voltage for a predetermined time, second storage means for storing said background level voltage for a period longer than said predetermined time to retain said voltage during correspondingly longer scans of intelligence, and brightness control circuit means coupled to said background reader circuit means and said scanning means for varying the brightness of said light spot in response to variations in the background on said document from lighter to darker backgrounds and from darker to lighter backgrounds.

2. In a facsimile communication system for transmitting video signals representative of the light values of intelligence on a document, a transmitter comprising:

light source image scanning means for repeatedly scanning successive parallel line paths across the document with a light spot, photomultiplier means responsive to the reflected light from the document for producing video signals in accordance with the reflected light values indicative of the intelligence and the background on the document during each scan of said scanning means, a first reader circuit coupled to said photomultiplier means, including circuit means responsive to changes in the background of the document for establishing an output voltage level indicative of the background level in the video signal resulting from said changes, and first storage means to store said voltage at said level for a predetermined time, a second reader circuit coupled to said first reader circuit for receiving the output thereof, including a second storage means to store said voltage at the level received from said first reader circuit for a period longer than said predetermined time in order to retain the level during correspondingly longer scans of intelligence on the document that persist longer than said predetermined time, brightness control circuit means coupled to said reader circuits and said scanning means for varying the brightness of said light spot in response to variations in the background level on said document from lighter to darker backgrounds and from darker to lighter backgrounds.

3. A facsimile communication system for transmitting signals representative of the light values of intelligence on a document to be transmitted comprising:

a transmitting unit having, light source image scanning means for repeatedly scanning successive parallel line paths across the document with a light spot, photodetector means responsive to the reflected light from the document for producing video signals in accordance with the reflected light values indicative of the intelligence and the background on the document during each scan of said scanning means, a first reader circuit for receiving said video signals, including circuit means responsive to a change in the background of the document for establishing an output voltage level indicative of the background level in the video signal resulting from said change, first storage means for storing said voltage at said level providing a fast response to said change in said background, a second reader circuit coupled to said first reader circuit for receiving the output thereof, including a second storage means to store said voltage at the level received from said first reader circuit providing a slow response to said change in said background;

brightness control circuit means coupled to said first and second reader circuits and said scanning means to vary the brightness of said light spot in response to variations in the background level on said document from lighter to darker backgrounds and from darker to lighter backgrounds, means for transmitting said signal pulses;

and a receiving unit for receiving said intelligence pulses including light source image scanning means for reconstituting the sequence of signal pulses into a visual image fascimile of the intelligence on the document.

4. In a facsimile communication system for transmitting signals representative of the light values of intelligence on a document, a transmitter comprising:

light source image scanning means for scanning across the document with a light spot, deflection means coupled to said image scanning means for causing said image scanning means to repeatedly scan successive parallel line paths, photomultiplier means optically cooperative with said image scanning means for producing video signals, in accordance with the reflected light values indicative of the intelligence and the background on the document during each scan of said scanning means, a first reader circuit coupled to said photomultiplier means, including circuit means responsive to a change in the background of the document for establishing an output voltage level indicative of the background level in the video signal resulting from said change, first storage means for storing said voltage at said level for a predetermined time to provide a fast response to said changes in said background, a second reader circuit coupled to said first reader circuit for receiving the output thereof, including a second storage means to store said voltage at the level received from said first reader circuit for a period longer than said predetermined time in order to retain the level during correspondingly longer scans of intelligence on the document that persist longer than said predetermined time and thereby provide a slow response to changes in said background, and a brightness control circuit means coupled to said first and second reader circuits and said scanning means to vary the brightness of said light spot in response to variations in the background level from lighter to darker backgrounds and from darker to lighter backgrounds.

5. A system as set forth in claim 2 wherein:

said first reader circuit includes first and second complementary transistors with emitter, base and collector electrodes, said base electrode of the first transistor coupled to said photomultiplier means to receive the video signal, said first storage means includes a capacitor connected to the respective emitters of said transistors, and said first transistor being responsive to a change in video signals representatives of the light values of the background in one direction for charging said capacitor more negative and said second transistor being responsive to a change in video signals representative of the light values of the background in another direction for charging said capacitor more positive, wherein the capacitor will retain a voltage level indicative of the background level in the video signal resulting from changes in light values of the background.

6. A system as set forth in claim 2 wherein:

said first reader circuit includes first and second complementary transistors with emitter, base and collecfor electrodes, said base electrode of the first transistor coupled to said photomultiplier means to receive the video signal, said first storage means including a first capacitor having a predetermined time constant connected to the respective emitters of said transistors, said first transistor being responsive to a change in video signals representative of the light values of the background in one direction for charging said first capacitor more negative and said second transistor being responsive to a change in video signals representative of the light values of the background in another direction for charging said first capacitor more positive, wherein the capacitor will retain a voltage level indicative of the background level in the video signal resulting from changes in light values of the background; and wherein, said second reader circuit is coupled to said first capacitor for receiving the output therefrom, said second storage circuit including a second capacitor having a time constant longer than the time constant for said first capacitor in order to retain the level during correspondingly longer scans of intelligence on the document that persist longer than the time constant of said first capacitor.

References Cited

UNITED STATES PATENTS

| | | | |
|---|---|---|---|
| 2,843,743 | 7/1958 | Hamilton | 330—17 |
| 3,018,331 | 1/1962 | McConnell | 178—7.1 |
| 3,172,051 | 3/1965 | Baron | 330—17 |
| 3,176,157 | 3/1965 | Vaughan | 330—17 |

DAVID G. REDINBAUGH, *Primary Examiner.*

J. A. ORSINO, *Assistant Examiner.*